(12) United States Patent
Mueller

(10) Patent No.: US 9,813,240 B2
(45) Date of Patent: Nov. 7, 2017

(54) METHOD AND DEVICE FOR GENERATING A SECRET KEY

(71) Applicant: Robert Bosch GmbH, Stuttgart (DE)

(72) Inventor: Andreas Mueller, Waiblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 45 days.

(21) Appl. No.: 14/922,886

(22) Filed: Oct. 26, 2015

(65) Prior Publication Data
US 2017/0012771 A1    Jan. 12, 2017

(30) Foreign Application Priority Data
Oct. 28, 2014    (DE) .................. 10 2014 221 881

(51) Int. Cl.
*G06F 21/00* (2013.01)
*H04L 9/08* (2006.01)
*H04L 12/26* (2006.01)

(52) U.S. Cl.
CPC .......... *H04L 9/0875* (2013.01); *H04L 9/0827* (2013.01); *H04L 9/0852* (2013.01); *H04L 43/0876* (2013.01)

(58) Field of Classification Search
CPC . H04L 9/0875; H04L 43/0876; H04L 9/0827; H04L 9/0852
See application file for complete search history.

(56) References Cited

U.S. PATENT DOCUMENTS

| | | | | |
|---|---|---|---|---|
| 7,942,324 B2* | 5/2011 | Chabanne | ............. | H04L 9/0858 235/439 |
| 2005/0276266 A1* | 12/2005 | Terry | ............. | H04L 1/0003 370/394 |
| 2007/0115796 A1* | 5/2007 | Jeong | ............. | H04L 1/0026 370/203 |
| 2007/0165845 A1* | 7/2007 | Ye | ............. | H04L 63/061 380/30 |
| 2008/0013738 A1* | 1/2008 | Tajima | ............. | H04L 9/0852 380/278 |
| 2008/0232394 A1* | 9/2008 | Kozek | ............. | H04B 3/32 370/465 |
| 2010/0067701 A1* | 3/2010 | Patwari | ............. | H04L 9/0838 380/279 |

(Continued)

OTHER PUBLICATIONS

R. Guillaume, A. Mueller, C. T. Zenger, C. Paar and A. Czylwik, "Fair Comparison and Evaluation of Quantization Schemes for PHY-based Key Generation," OFDM 2014; 18th International OFDM Workshop 2014 (InOWo'14); Proceedings of, Essen, Germany, 2014, pp. 1-5, Conference Date Aug. 27-28, 2014, added to IEEE Xplore Oct. 17, 2014.*

*Primary Examiner* — David García Cervetti
(74) *Attorney, Agent, or Firm* — Norton Rose Fulbright US LLP; Gerard Messina

(57) ABSTRACT

In a method for generating a secret key, a first node which is connected via a transmission channel to a second node estimates a variability of the transmission channel with regard to at least one physical channel parameter of the transmission channel, selects a sampling rate for the channel parameter as a function of the variability, generates a bit sequence by sampling the channel parameter at the selected sampling rate, and adjusts the bit sequence with the second node.

9 Claims, 1 Drawing Sheet

(56) References Cited

U.S. PATENT DOCUMENTS

| | | | | |
|---|---|---|---|---|
| 2011/0142236 A1* | 6/2011 | Nica | ........................ | H04L 63/06 380/255 |
| 2013/0028515 A1* | 1/2013 | Fukuhara | .................. | G06T 5/40 382/168 |
| 2013/0156181 A1* | 6/2013 | Baek | ..................... | H04L 9/0875 380/44 |
| 2013/0343208 A1* | 12/2013 | Sexton | ....................... | H04L 7/04 370/252 |
| 2013/0346459 A1* | 12/2013 | Boehl | ..................... | G06F 7/582 708/251 |

* cited by examiner

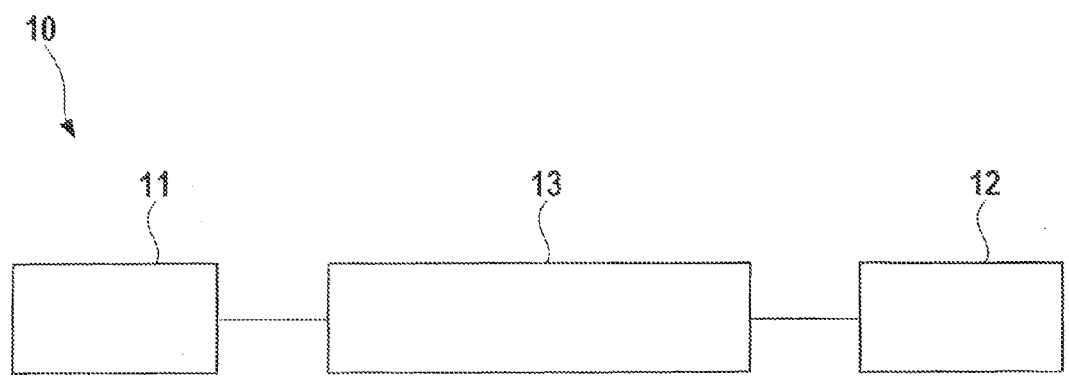

METHOD AND DEVICE FOR GENERATING A SECRET KEY

BACKGROUND OF THE INVENTION

1. Field of the Invention

The present invention relates to a device and a method for generating a secret key.

2. Description of the Related Art

A symmetric cryptographic system is a cryptographic system in which, in contrast to an asymmetric cryptographic system, all (legitimate) participants involved use the same key. The utilization of one and the same key for encrypting and decrypting data for computing and checking the message authentication codes, etc., involves that prior to any encrypted exchange the key itself must initially be distributed. However, since the safety of the entire method depends on the secrecy of the key, conventional approaches in most cases provide for the key exchange via a secure channel. This may take place, in particular, by manually introducing the key into the respective participants, e.g., by entering a password from which the actual key may then be deduced.

However, the key exchange via unsecure channels, which is known in cryptography as the "key distribution problem," still presents a challenge to those skilled in the art. To solve this problem, the related art offers approaches such as the known Diffie-Hellman key exchange or the so-called hybrid encryption process which enable the exchange of symmetric keys by incorporating asymmetric protocols.

In the recent past, cryptographic systems are, however, increasingly discussed which deflect the problem of key establishment from the application layer of the OSI reference model to its bit transmission layer (physical layer, PHY). Approaches of this type are applied in the still young field of cyber-physical systems which distinguish themselves by predominantly using wireless and thus inherently unsafe communication channels.

Corresponding methods provide that each of the participating parties deduces a key from the physical characteristics of the channel which connects them in such a way that the keys generated in this way match without making it necessary for concrete parts of the key to be transmitted. U.S. Pat. No. 7,942,324 B1 provides a method of this type, as an example.

One essential prerequisite for the fact that the generated keys are of high quality (and thus secure) is that the generated keys include an approximately even distribution and maximum entropy. This, in turn, generally requires a sufficiently high variability of the transmission channel (or, in particular, of the channel parameters underlying the key generation). The variability of the relevant channel parameters may, however, differ a great deal and also vary timewise depending on the prevailing propagation conditions. In a wireless communication system, the time variance of the transmission channel is, for example, a function of the number of the scattered objects present between the transmitter and the receiver (and in their vicinity), among other things, as well as of the dynamic of the propagation scenario which may be completely static as well as very dynamic, e.g., when many objects—possibly including the transmitter or the receiver itself—are moving. Accordingly, it is, however, very difficult to optimally parametrize corresponding key generation processes a priori for the purpose of generating keys of sufficiently high quality within a minimum amount of time, since a compromise between the key generation rate and the key quality (in the sense of the key entropy) is required for this purpose.

BRIEF SUMMARY OF THE INVENTION

One advantage of this approach is the achieved dynamic and automatable adaptation of the key generation to the variability of the transmission channel, so that an optimized adjustment between the key generation rate and the key quality may be found in a very generic manner. In this way, the time needed for the key generation may be minimized in order to, for example, reduce the energy consumption of a node or to keep the installation time for a node as short as possible. Nonetheless, the minimization of the key generation time takes place by taking into consideration a required minimum quality of the generated keys, so that they cannot be easily guessed by an attacker or ascertained by themselves.

For example, the first node may estimate the variability with regard to multiple physical channel parameters and select the channel parameters to be sampled from the channel parameters as well as the sampling rate for each of the channel parameters to be sampled as a function of the variability. Depending on the utilization scenario, channel parameters which are unsuited in general may thus be disregarded in favor of more meaningful channel parameters during the key generation.

Analogously, the second node may also estimate the variability with regard to the channel parameters, whereupon the first node and the second node coordinate the channel parameters to be sampled and their respective sampling rates with one another via the transmission channel. This approach prevents a one-sidedly oriented selection of channel parameters and their associated sampling rates which disregards the operating conditions of the node which is not involved in the selection process.

Channel parameters which are selected by both the first node and the second node, in particular, come into consideration as channel parameters to be sampled, the respective sampling rate being the smaller one of the sampling rates selected by the first node and by the second node. This embodiment corresponds to a conservative approach according to which only those channel parameters are considered which are identified as candidates equally by both nodes.

The estimation of the variability, however, may take place, for example, as a function of an autocorrelation, a variance, a standard deviation, a level crossing rate, or a frequency distribution of the channel parameter as well as any arbitrary combination of these or other suitable statistic variables. These criteria generally allow for a direct conclusion to be drawn to the present variability and thus provide the method according to the present invention with a particularly high accuracy.

The actual variability of the transmission channel may also be indirectly inferred from a possible Doppler effect on the transmission channel, the proper motion, or the environmental dynamics of one of the nodes. An estimation which takes these parameters into consideration is thus able to use the already present signal processing processes or any acceleration or rotation rate sensors of one or both node(s) particularly efficiently.

BRIEF DESCRIPTION OF THE DRAWING

The FIGURE shows a system according to the present invention including two nodes which are connected to one another by a joint transmission channel.

DETAILED DESCRIPTION OF THE INVENTION

A system 10 according to the FIGURE is contemplated in the following, a first node 11 and a second node 12 communicating with one another via a transmission channel 13 and generating symmetric cryptographic keys based on suitable characteristics of this transmission channel 13. In this case, transmission channel 13 may be wireless, wired, or also optical in nature, a wireless transmission channel 13 being in particular contemplated in one advantageous embodiment of the present invention.

The method according to the present invention is generally subdivided into a series of consecutive method steps which are now to be contemplated in detail.

In a first method step, the first node and the second node estimate a variability of transmission channel 13 with regard to at least one, preferably, however, multiple physical channel parameters of transmission channel 13. In advantageous embodiments, these channel parameters may be so-called "received signal strength indicators" (RSSI values), channel pulse responses, or the instantaneous attenuation or phase shift of transmission channel 13.

The estimation of the variability of transmission channel 13 may take place directly or indirectly with regard to the individual channel parameters. In the case of a direct estimation, a sequence of estimated values of a channel parameter or parameters, which are a direct function thereof, is contemplated and the variability of the channel parameter is derived based thereon. In the case of an indirect estimation, certain variables and/or boundary conditions are ascertained which in general have an influence on the relevant channel parameters, the concrete influence in any special case, however, not always being determined completely unambiguously, since other variables or boundary conditions may also play a decisive role.

A direct estimation of the variability (based on a sequence of estimated values of a certain channel parameter which have been ascertained within a time period $\Delta T$) may, for example, take place as a function of an autocorrelation, variance, standard deviation, level crossing rate, or frequency distribution of the channel parameter.

An indirect estimation may, however, take place, for example, by estimating the Doppler frequency, the Doppler shift, or the (absolute) speed of first node 11 or of second node 12. In this case, the speed may not only be estimated, but accurately ascertained, e.g., if accurate position information, as provided by global navigation satellite systems, is available.

Any acceleration or rotation rate sensors or external data sources such as the speedometer of a vehicle may provide suitable indications with regard to the speed. The dynamic of the propagation scenario may also prove to be a helpful indicator. The dynamic of the propagation scenario may be detected with the aid of photo or camera sensors, for example, which ascertain to what extent the surroundings change over time, e.g., due to moving objects.

In a second method step, the first node and the second node then select a sampling rate for the channel parameter as a function of the variability in such way that consecutive sampling values are approximately statistically independent. Alternatively (or additionally) thereto, a suitable subset which is supposed to function in the further procedure as the basis for the key generation is selected from the amount of principally possible channel parameters.

The optimal time which should elapse between two consecutive sampling points in time of a certain channel parameter corresponds exactly to the decorrelation time of this parameter which is also referred to as a coherence time. This is namely exactly the minimum time for which the two consecutive sampling values are statistically essentially independent. The decorrelation time may, however, merely be estimated in real systems. Different options for estimating corresponding decorrelation time $T_G$ are conceivable depending on the type of the estimation of the variability of the contemplated channel parameters as the one taking place in the first method step.

For example, in the case of a wireless transmission channel 13, the coherence time may be estimated based on the (maximum) Doppler frequency $f_D$ under the assumption of the common Jakes' model as follows:

$$T_C \approx \sqrt{\frac{9}{16 \cdot \pi \cdot f_D^2}}$$

For this purpose, the (maximum) Doppler frequency may be computed based on the availability of the speed of a participant in conjunction with the knowledge about the carrier frequency of transmission channel 13, and the coherence time may thus be subsequently estimated with the aid of the formula above. A direct derivation of the decorrelation time from the ascertained autocorrelation of a certain (sufficiently long) sequence of sampling values also comes into consideration.

Moreover, further, rather heuristic adaptations of the sampling rate for a certain channel parameter to the estimated variability of the channel are possible. The establishment of the sampling rate as a function of the estimated variance, standard deviation, level crossing rate, or frequency distribution of the corresponding channel parameter within a certain time period should also be considered. If the variance is, for example, rather small within time period $\Delta T$, the sampling rate will be reduced; in the case of a large variance, rather increased.

Finally, the establishment of the sampling rate may take place as a function of the observed environmental dynamics. The presence of many moving objects, for example, rather suggests a high sampling rate, whereas in the case of a comparably static scenario, a rather low rate is recommended. It is understood that for optimizing the sampling rate for a certain channel parameter, a combination of different criteria may also be taken into consideration.

If, in principle, different channel parameters come into consideration for the key generation, an optimized sampling rate may be initially ascertained as described above for each of these potential parameters, and subsequently, a subset may be selected therefrom which is in fact to be considered in the further procedure. This selection may, for example, take place as a function of the available computing and storing resources or of the available power. In one advantageous embodiment, that parameter which has the smallest (estimated) decorrelation time and thus results in and of itself in the highest (initial) key generation rate is, for example, selected from all potentially possible channel parameters. The selection of a subset of channel parameters is, however, optional. It is also always possible to use all potential channel parameters for the actual key generation.

Either different (individually optimized) sampling rates may be used for the channel parameters which are in fact to be used for the key generation in the further procedure or a common sampling rate may be established for all contemplated channel parameters. This may, for example, take place in such a way that the minimum of all individually optimized sampling rates is used.

In a third method step, the first node and the second node coordinate the channel parameters to be sampled and the respective sampling rates with one another via transmission channel 13. The determination of one or multiple optimized sampling rate(s) as well as the (optional) selection of suitable channel parameters may be initially carried out locally by first node 11, by second node 12, or by both nodes. It must be subsequently ensured that first node 11 and second node 12 agree on the same selection of channel parameters as well as the associated sampling rates.

If, for example, the second method step is carried out only by first node 11, this node may simply signal its decision to second node 12 with the aid of a suitable message and second node 12 then adopts this decision. The signaling of this message may optionally be acknowledged.

If, however, the second method step is carried out by first node 11 and by second node 12 (initially independently from one another), one node may initially communicate its preliminary decision to the other node in one advantageous embodiment. The latter node then ascertains based on its own preliminary decision as well as based on the preliminary decision transmitted by the other node an optimized overall decision (this means the selection of the channel parameters to be contemplated including the associated sampling rates) and, in turn, subsequently communicates this decision to the other node with the aid of a suitable message, this node then adopting this overall decision. In one advantageous embodiment, the overall decision is ascertained in such a way that only those channel parameters are to be considered which were identified as potential candidates by both nodes, the sampling rates to be used each corresponding to the minimum of the sampling rates desired by both nodes.

In a fourth method step, first node 11 and second node 12 both (locally) generate initial bit sequences by sampling the channel parameters at the sampling rate selected in each case. The first, the second, the third, and the fourth method steps are repeated several times consecutively or individually as required so that the bit sequence is put together from multiple consecutively generated partial sequences, a suitable adaptation of the channel parameters to be sampled and the respective sampling rates taking place between the generation of two partial sequences.

In a fifth, final method step, first node 11 and second node 12 adjust their respective bit sequences to one another in order to derive, with the aid of a suitable preparation, the actually desired symmetric cryptographic keys with the aid of already known processes. For this purpose, there is a plurality of available approaches which are commonly referred to as "information reconciliation" processes. The adjustment may, for example, take place with the aid of error-correcting codes as well as a suitable communication protocol.

What is claimed is:

1. A method for generating a secret key, comprising:
   estimating, by a first node which is connected via a transmission channel to a second node, a variability of a physical channel parameter of the transmission channel;
   selecting, by the first node, a sampling rate for the physical channel parameter as a function of the estimated variability of the physical channel parameter, the sampling rate being the rate at which instantaneous values of the physical channel parameter are measured;
   measuring, at the selected sampling rate by the first node, the instantaneous values of the physical channel parameter to obtain a plurality of instantaneous measured values of the physical channel parameter;
   generating, by the first node, a bit sequence based on the plurality of instantaneous measured values of the physical channel parameter; and
   adjusting, using an information reconciliation process, by the first node, the bit sequence between the first and second nodes, to generate the secret key.

2. The method as recited in claim 1, wherein:
   the first node estimates the variability with regard to multiple physical channel parameters;
   the first node selects channel parameters to be measured from the multiple physical channel parameters as a function of the variability; and
   the first node selects the sampling rate for each of the channel parameters to be sampled.

3. The method as recited in claim 2, further comprising:
   estimating, by the second node, the variability with regard to the channel parameters; and
   coordinating, by the first node and the second node, the channel parameters to be measured and corresponding respective sampling rates with one another via the transmission channel.

4. The method as recited in claim 3, wherein:
   the channel parameters to be measured are channel parameters which were selected by both the first node and the second node; and
   the respective sampling rate is the smaller one of the sampling rates selected by the first node and by the second node.

5. The method as recited in claim 2, wherein the estimation of the variability takes place as a function of at least one of the following variables: an autocorrelation, a variance, a standard deviation, a level crossing rate, and a frequency distribution of the channel parameter.

6. The method as recited in claim 5, wherein the estimation of the variability takes place with the aid of at least one of the following occurrences: a Doppler effect on the transmission channel; a movement of one of the first node or the second node; and environmental dynamics of one of the first node or the second node.

7. The method as recited in claim 2, wherein the sampling rate selected for a channel parameter corresponds to decorrelation time of the channel parameter.

8. A system for generating a secret key, comprising:
   at least one controller including a processor configured to:
   estimate a variability of a physical channel parameter of a transmission channel connecting a first node to a second node;
   select a sampling rate for the physical channel parameter as a function of the estimated variability of the physical channel parameter, the sampling rate being the rate at which instantaneous values of the physical channel parameter are measured;
   measure, at the selected sampling rate, the instantaneous values of the physical channel parameter to obtain a plurality of instantaneous measured values of the physical channel parameter;
   generate a bit sequence based on the plurality of instantaneous measured values of the physical channel parameter; and
   adjust, using an information reconciliation process, the bit sequence between the first node and the second node, to generate the secret key.

9. A non-transitory, computer-readable memory medium storing a computer program having program codes which, when executed on a computer, perform a method for generating a secret key, the method comprising:

estimating a variability of a physical channel parameter of a transmission channel connecting a first node to a second node;

selecting a sampling rate for the physical channel parameter as a function of the estimated variability of the physical channel parameter, the sampling rate being the rate at which instantaneous values of the physical channel parameter are measured;

measuring, at the selected sampling rate, the instantaneous values of the physical channel parameter to obtain a plurality of instantaneous measured values of the physical channel parameter;

generating a bit sequence based on the plurality of instantaneous measured values of the physical channel parameter; and adjusting, using an information reconciliation process, the bit sequence between the first node and the second node, to generate the secret key.

\* \* \* \* \*